Jan. 31, 1928.

C. D. STEWART 1,657,557

MOTOR VEHICLE BRAKE

Filed Feb. 5, 1926

INVENTOR
CARLTON D. STEWART
BY Wm. M. Cady
ATTORNEY

Patented Jan. 31, 1928.

1,657,557

UNITED STATES PATENT OFFICE.

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

MOTOR-VEHICLE BRAKE.

Application filed February 5, 1926. Serial No. 86,204.

This invention relates to brakes, and more particularly to a vehicle brake of the internal expanding drum type.

It has heretofore been proposed to employ metal brake shoes in connection with a vehicle brake of the above type and to provide thick brake shoes, such that considerable wear can take place before it is necessary to replace the brake shoes.

As the brake shoes wear down, an increased expansive movement of the braking members is required in applying the brakes. The available space for installing the usual release spring is limited and with the ordinary relatively small release spring, it is evident that an increased expansive movement of the braking members will tend to stretch the release spring to such an extent as to cause an appreciable increase in the spring resistance to the expansive movement of the braking members; so that additional power is required in order to force the braking members into engagement with the brake drum.

Furthermore, the increased stretching of the release spring tends to stretch the spring beyond the elastic limit and thus cause the spring to take on a permanent set, which is undesirable.

The principal object of my invention is to provide an improved release spring construction in which the above mentioned difficulties are obviated.

Figure 1:
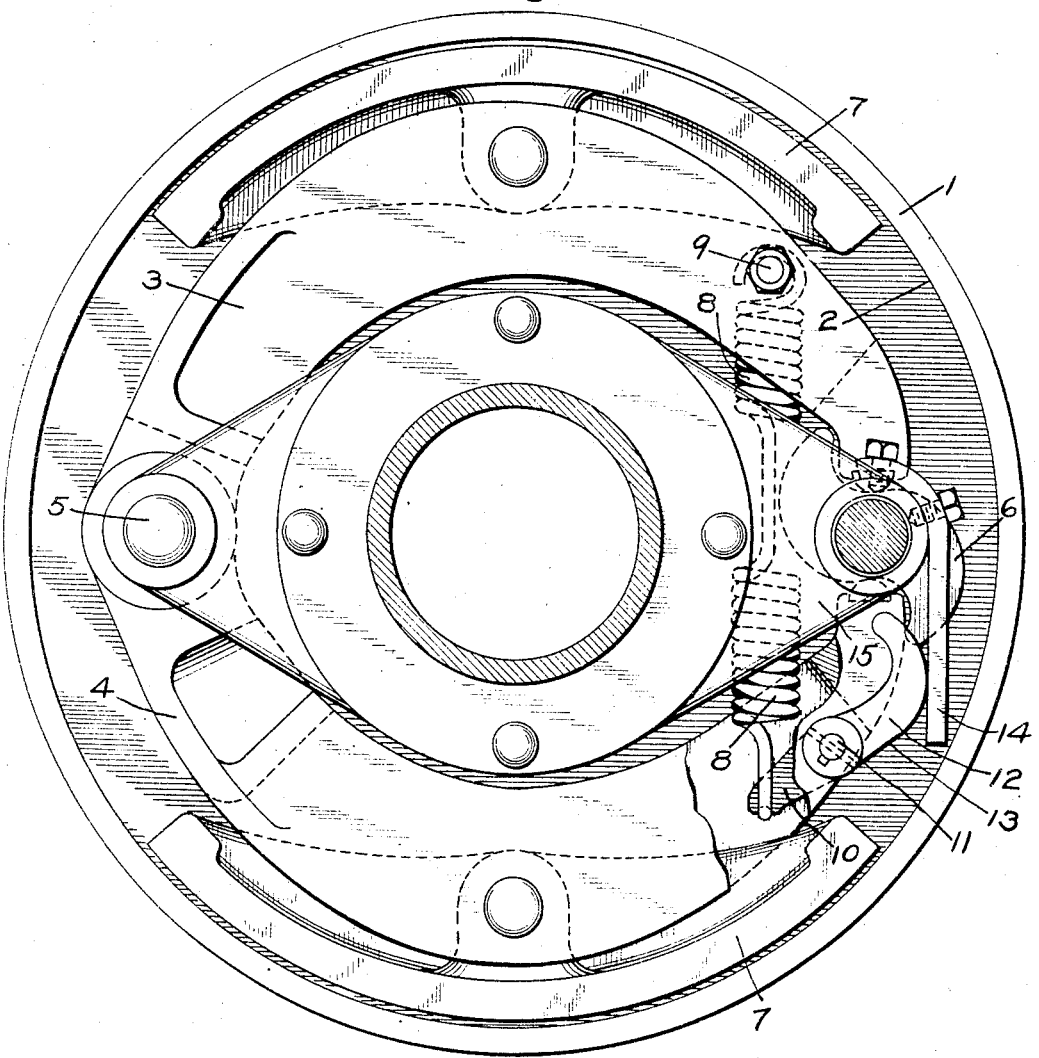
Figure 2:
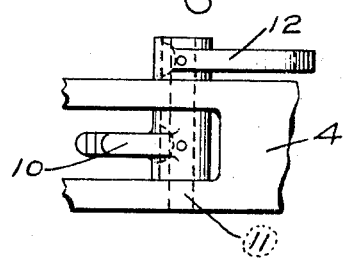

In the accompanying drawing; Fig. 1 is a face view of an internal expanding drum type of brake, showing my improved release spring construction applied thereto; and Fig. 2 a fragmentary plan view of the release spring cam and lever construction.

The brake construction shown in the drawing comprises a brake drum 1 having an internal friction face 2 and brake heads 3 and 4 mounted within said drum and pivotally connected together by a hinge pin 5.

Interposed between the free ends of the brake heads 3 and 4 is a cam 6, the rotation of which is adapted to effect the expansive movement of the brake heads. A brake shoe 7 is pivotally connected to each brake head and is provided with an arcuate friction face adapted to engage the friction face 2 of the brake drum 1.

A release spring 8 extends into a channel formed in the brake head 3 and is provided with a hooked end which engages a bolt 9 carried by said head. The opposite hooked end of said spring engages an arm 10 which is secured to a rotatable pin 11 mounted in the brake head 4. Also secured to said pin is a lever 12 having a cam face 13 adapted to engage a fixed member 14 which is secured to a stationary member 15.

When the brake heads 3 and 4 are expanded by rotation of the cam 6 to apply the brakes, the pivot pin 11 moves with the brake head 4 on an arc of a circle having its center at the hinge pin 5 and said pivot pin therefore moves away from the fixed member 14. The lever 12 is also moved away from the member 14, so that said lever is rotated by the pull of the released spring 8 and the extent of rotation will be dependent upon the shape of the cam face 13 in engagement with the member 14.

The release spring 8 is thus relieved from stretching to the extent that the movement of the arm 10 compensates for the reverse expansive movement of the brake heads 3 and 4.

Preferably, the contour of the cam face 13 is such that the movement of the arm 10 substantially equals the expansive movement of the brake heads and in such case, the tension of the release spring 8 will remain substantially constant during the expansive movement of the brake heads.

It will be understood that the usual initial tension in the release spring remains in the spring as the brake heads are expanded and provides the force for effecting the release movement of the brake heads.

Having now described my invention, what I claim as new and desire to secure by Letters Patent, is:—

1. In a vehicle brake, the combination with a brake drum and expansible brake heads associated with said drum, of a release spring connected to one brake head, a lever pivotally mounted on the other brake head and connected to said spring, a stationary member, a cam carried by said lever and engaging said stationary member, to permit rotation of said lever as the brake heads are expanded.

2. In a vehicle brake, the combination with a brake drum and expansible brake heads associated with said drum, of a release spring connected to one brake head, a lever pivotally mounted on the other brake head and connected to said spring, a stationary member, and a cam carried by said lever and engaging said stationary member, to permit rotation of said lever as the brake heads are expanded, the cam being so contoured that the lever rotates to substantially the same extent as the brake heads expand, thereby preventing the release spring from substantially stretching.

3. In a vehicle brake, the combination with a brake drum and expansible brake heads mounted therein, of a release spring connected to one brake head, a cam lever pivotally mounted on the other brake head and connected to said spring, and a stationary member engaging said cam lever to permit rotation of said lever by the pull of said spring as the brake heads are expanded.

In testimony whereof I have hereunto set my hand.

CARLTON D. STEWART.